May 5, 1942.  A. O. RIORDAN  2,281,802
APPARATUS FOR STRAIGHTENING THE EDGE OF A DOUGH
SHEET PREPARATORY TO COILING
Filed July 24, 1941
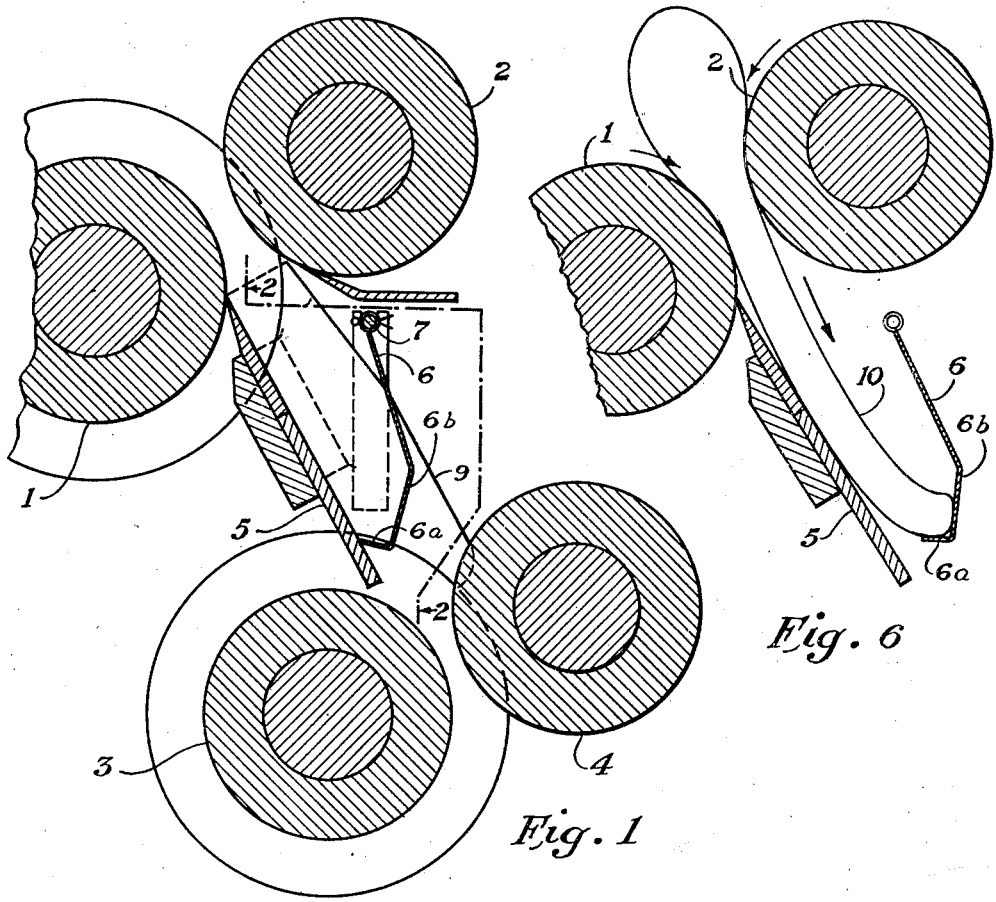
Fig. 1
Fig. 6
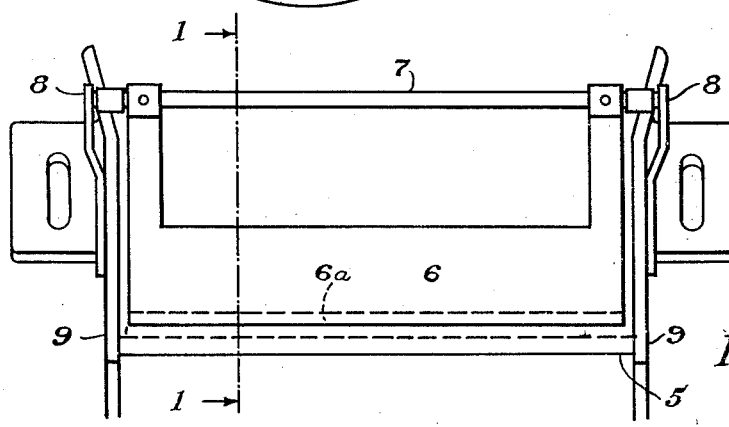
Fig. 2
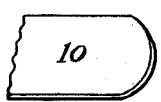
Fig. 3
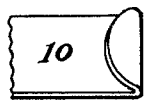
Fig. 4
Fig. 5
INVENTOR
ALBERT O. RIORDAN
BY
ATTORNEY Patented May 5, 1942

2,281,802

UNITED STATES PATENT OFFICE 2,281,802

APPARATUS FOR STRAIGHTENING THE EDGE OF A DOUGH SHEET PREPARATORY TO COILING

Albert O. Riordan, Saginaw, Mich., assignor to Baker Perkins Inc., Saginaw, Mich., a corporation of New York Application July 24, 1941, Serial No. 403,850

7 Claims. (Cl. 107—9)

This invention relates to bakers' dough moulders and has for its object the provision of an improved device for straightening the leading edge of a dough sheet preparatory to coiling it into cylindrical loaf form. More particularly it pertains to apparatus adapted to installation between two pairs of the sheeting rolls of existing moulders for folding the rounded front edge of a dough sheet to form the said straight edge.

It is well known in the baking art that when a dough sheet is rolled up around the curved edge formed by the rolling operation the ends of the loaf are apt to be slack and contain pockets filled with air or dusting flour. This defect is evidenced in baked loaves by large air bubbles or pellets of dry flour about an inch from the ends. If the rounded edge of the sheeted dough is squared by folding it over and flattening it, the sheet can be formed into a coil having a nearly uniform amount of dough from end to end.

In the prior art this end-folding has been done by a separate mechanism located after the final sheeting rolls and before the coiling and moulding apparatus. The folding mechanism has comprised a flat horizontal conveyor to receive the dough sheets and a pivoted hooked member to pick up the leading edge of the sheet from the conveyor and fold it back. A rolling device followed the folding member to flatten the folded sheet.

My invention obviates a separate mechanism of this kind and provides a simple folding device for use in conjunction with the sheeting rolls of the molder itself, thereby eliminating the said conveyor and the subsequent roll or rolls for flattening the fold. With my invention also, separate sheeting and moulding machines are not required, as is the case with earlier folding devices. It can be used with an inexpensive unitary sheeting and moulding machine.

Another important advantage of the invention is that an extra working of the dough in a second rolling operation is avoided. Punishment of the dough which impairs its baking properties and has made the earlier devices unsuitable for certain tender doughs is not increased over that caused by the sheeting apparatus used without my device; also, it may be used upon any dough which can be handled by the conventional sheeting apparatus.

The foregoing advantages are more fully explained and other objects and advantages of the invention are made apparent in the following description and in the accompanying drawing, in which:

Fig. 1 is a sectional side elevation showing mechanism embodying the invention applied between two pairs of sheeting rolls in a conventional moulder, taken along line 1—1 in Fig. 2;

Fig. 2 is a fragmentary front elevation, partly in section, taken along line 2—2 in Fig. 1, the sheeting rolls being omitted for greater clarity;

Figs. 3, 4, and 5 respectively show the leading edge of a dough sheet before it is folded, after folding, and after the folded end has been flattened by the final pair of sheeting rolls; and Fig. 6 is a fragmentary side view of the folding apparatus of Figs. 1 and 2, showing a dough sheet in the process of having its leading edge folded.

Referring to Fig. 1, the apparatus of the invention is located between an upper pair of sheeting rolls 1, 2 and a lower pair 3, 4 located to receive a partly sheeted dough piece from the first rolls 1, 2 and complete the sheeting operation. The improved folding mechanism comprises an inclined guide 5 in the form of a plate, grooved or smooth, or a plurality of alined parallel fingers arranged to conduct a dough sheet issuing from between rolls 1, 2 into the nip of rolls 3, 4. It also backs the dough sheet during the folding operation, co-operating with the hooked folding member 6.

Member 6, spanning the length of the sheeting rolls 1, 2, is pivotally suspended from a cross-shaft 7 which is supported at its ends by brackets 8 fastened to the side frame members 9 of the machine. The guide member 5 is steeply inclined as shown, preferably past the angle of repose of dough, whereby it co-operates more effectively with the dough sheet and the folding member 6 than do the horizontal belt conveyors of the prior art folders. The shaft 7 is pivoted at a point such that folding member 6 normally rests against guide 5 with light pressure. The folding member 6 is preferably formed to present in its normal positon a hook portion 6a, horizontal or upwardly bent toward its edge, and an upright or slightly inclined portion 6b which acts as an abutment and guide for the edge of the dough sheet. It may alternatively be curved instead of angularly bent, to pick up and guide the edge of the dough sheet in the same manner.

In operation, as illustrated in Fig. 6, a partially flattened dough sheet 10 is delivered from the nip of rolls 1, 2 and travels down the guide member 5 until its leading edge engages the upwardly bent extremity 6a of the folding member 6. The edge is picked up while the sheet, by gravity and the feed action of rolls 1 and 2, continues to advance. The leading edge of the dough sheet travels over the portion 6a until it engages the upwardly bent portion 6a and displaces the free-swinging member 6 outwardly. The bight of the folded sheet then passes beneath the edge of the hooked portion 6a, drawing the erstwhile leading edge behind it. The extent or depth of the fold is determined by the depth of the hooked portion 6a of member 6. If a very short fold is desired a member 6 with a shallow portion 6a is provided. If a wider fold is required a more deeply hooked folding member 6 is installed.

A large portion of a dough sheet may be folded by my device, since its leading edge travels horizontally or downwardly along the bent portion 6a. In prior art devices for this purpose, which carried the dough sheet in a horizontal path, only a very small fold could be made because the hooked dough sheet was pushed upwardly into the hook member and, being soft, would collapse if pushed to a substantial height. Partly for this reason earlier edge folders have been unsuccessful with exceedingly tender doughs, as for example rye bread dough. On this account also the prior art machines were used principally for short small dough pieces, such as finger rolls, as they could not fold wide dough sheets for full sized bread loaves of wheat bread sufficiently deeply so that the fold would span the entire width of the sheet, as is necessary to produce well-filled solid ends on loaf-sized dough pieces formed by coiling the sheets.

The bight of the folded sheet (see Fig. 4) next enters between the rolls 3, 4, which press the fold flat and also finish the sheeting operation. The straightened end 11 of the dough piece (see Fig. 5) then falls upon a rotating curling roll of known kind, not shown, which coils the sheet about the edge 11 as a core. The coiled sheet then falls from the curling roll and is delivered into a moulding apparatus of known form which shapes and compacts the dough piece ready for depositing in the baking pan. By combining the fold-flattening and final sheeting operations, any extra rolling is made unnecessary, whereas the separate machines employed for this purpose follow the final sheeting rolls, and must in turn be followed by another rolling operation to flatten the fold. The baking quality of the tenderest dough that can be sheeted by a given machine is not impaired by the addition of my device.

The invention can readily be installed in the sheeting mechanism of existing moulders at very low cost. The conventional relatively inexpensive moulders combine the sheeting rolls, curling mechanism, and moulding drum or belt in one frame. Because of this construction an end folder could not be installed heretofore by a baker without replacing his existing moulder by separate sheeting and moulding machinery, and provision had to be made for driving the band of the folder. The guide fingers or plates 5 and the folding member 6 of this invention, however, can be placed in a machine of conventional design with a very few simple fastenings. In some instances the folding member 6 is all that needs to be purchased since no driven elements whatever need to be provided.

Another advantage of my invention over its horizontal travel on the moving belts heretofore used is that it is possible to operate a machine at very much higher speed than is possible with the band-type folders. A dough sheet travels down the steeply inclined guide member 5, bearing upon it very lightly, and because the guide is stationary, its leading edge may be lifted freely without having to overcome any adhesion or suction. My device does not reduce the rate of output of a machine to which it may be applied, whereas with a dough sheet resting flat upon power-driven canvas belt as heretofore, there is considerable adhesion and static friction, which limit the speed with which the sheet may be lifted and turned back without tearing it or fouling the folding member.

High speed operation of my device is further assisted by the sheeting rolls 1 and 2 which grip the dough sheet 10 and feed it forward while it is being folded. By this positive gripping action the sheet is backed so that even at very high speeds it will not be checked and perhaps turned over by the hook member 6, fouling the folding member and spoiling the loaf. This is almost certain to happen if an earlier type folder is speeded up in an attempt to match the speed of the usual sheeting and molding machines, since only friction holds the dough sheet to the conveyor belt which propels it against the folding member.

Having thus described my invention, what I claim and desire to secure by Letters Patent is:

1. In a dough moulder, in combination, apparatus for straightening the leading edge of a dough sheet preparatory to coiling and moulding it into a loaf, comprising a stationary inclined guide member located between the last two pairs of sheeting rolls of a dough moulder to guide a sheet of dough from the next-to-last pair of rolls into the nip of the final pair and a yieldingly mounted hooked folding member normally in contact with said guide member operable to engage the leading edge of the sheet, direct it outwardly from said guide member approximately horizontally or downwardly and then fold said edge back upon the sheet for flattening between the final pair of sheeting rolls.

2. Apparatus for straightening the leading edge of a dough sheet preparatory to coiling it into a loaf, comprising a guide member adapted to be fixed at an incline between the last two pairs of sheeting rolls of a dough moulder to receive a dough sheet from the next-to-last pair and deliver it into the nip of the final pair and a yieldingly mounted hooked folding member normally in contact with said guide member operable to engage the leading edge of the sheet, direct it outwardly from said guide member horizontally or downwardly, and fold said edge back upon the sheet for flattening between said final pair of sheeting rolls.

3. Apparatus for straightening the leading edge of a dough sheet preparatory to coiling it into a loaf, comprising a guide member adapted to be fixed between the last two pairs of sheeting rolls of a dough moulder at an inclination greater than the angle of repose of the dough sheet and a yieldingly-mounted hooked folding member erable to engage the leading edge of the sheet, normally in contact with said guide member operable direct it outwardly from the guide member, and fold said edge back upon the sheet for flattening between the final pair of sheeting rolls.

4. Apparatus as claimed in claim 3 wherein the hooked folding member is pivotally suspended above said guide member at a point located so that the edge of said folding member normally rests with light pressure against the guide member.

5. Apparatus for straightening the leading edge of a dough piece preparatory to coiling it into a loaf, comprising a guide member adapted to be fixed between the last two pairs of sheeting rolls of a dough moulder at an inclination such that a dough sheet will travel down it freely by gravity from the next-to-last pair into the nip of the final pair of rolls and a yieldingly-mounted hooked folding member normally in contact with said guide member operable to engage the leading edge of the sheet and fold it back for flattening between said final pair of sheeting rolls.

6. In a dough moulder, in combination, apparatus for straightening the leading edge of a dough piece preparatory to coiling it into a loaf, comprising a guide member fixed between the last two pairs of sheeting rolls of a dough moulder inclined so that a dough sheet will travel down it freely by gravity and positioned to receive said dough sheet from the next-to-last pair and deliver it into the nip of the final pair of rolls, and a yieldingly-mounted hooked folding member normally in contact with said guide member operable to engage the leading edge of the sheet and fold it back for flattening between said final pair of sheeting rolls.

7. Apparatus as claimed in claim 6 wherein the hooked folding member is pivotally suspended above said guide member at a point located so that the edge of said folding member normally rests with light pressure against the guide member.

ALBERT O. RIORDAN.